Oct. 31, 1967   W. SALISBURY   3,350,114
RUBBER ARTICLE
Filed Sept. 10, 1965
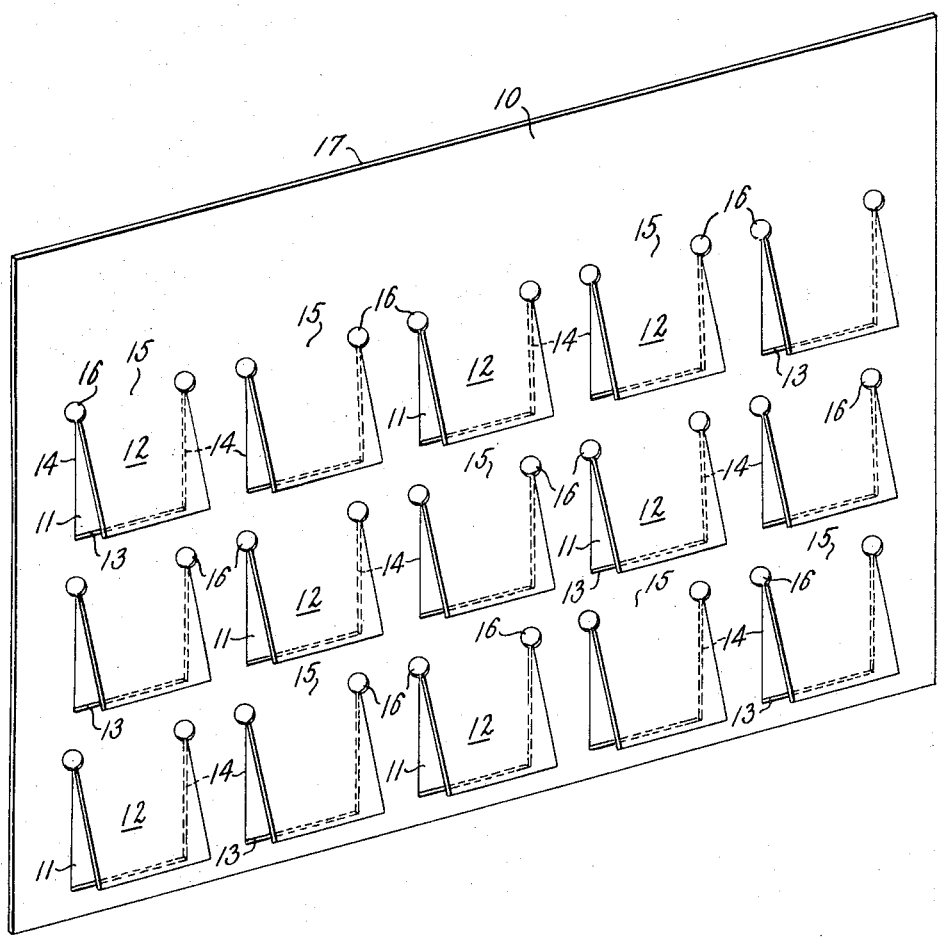
INVENTOR
WILFRED SALISBURY
BY James R. Huler
ATTORNEY

# United States Patent Office 3,350,114
Patented Oct. 31, 1967

3,350,114
RUBBER ARTICLE
Wilfred Salisbury, Edinburgh, Scotland, assignor to The North British Rubber Company Limited, Edinburgh, Scotland
Filed Sept. 10, 1965, Ser. No. 486,489
1 Claim. (Cl. 280—154.5)

ABSTRACT OF THE DISCLOSURE

This disclosure relates to a mudflap mounted rearwardly of at least the rear wheels of a wheeled vehicle. The flap is made of a sheet of elastomeric material. The sheet has a plurality of apertures therethrough and hinged flaps covering these apertures. The flaps are integral with the sheet along one edge and the ends of that one edge are formed with circular apertures, so that the flaps will be sufficiently flexible to be opened by a stream of aqueous matter and capable of deflecting the aqueous matter downwardly.

---

The present invention relates to mud flaps for motor vehicles of the type comprising a sheet of material adapted to be attached to the vehicle and positioned adjacent the rear of the front and/or rear wheels to provide protection against the splashing of mud and water (hereinafter referred to as "aqueous matter") onto the underside of the vehicle or in the direction of following traffic.

Known mud flaps of the type referred to suffer from the disadvantage that the aqueous matter can only be disposed of at the base or edges of the flap which results in an accumulated stream. Furthermore, the air current created by the moving vehicle in striking the mud flap carries the accumulated stream a substantial distance before being deposited.

The object of the present invention is to overcome the above disadvantage.

The present invention consists in a mud flap of the type referred to, wherein a plurality of apertures are formed in said sheet, each of which is covered by a flap hinged along one edge of the aperture.

The figure is a perspective view of a mud flap according to the present invention.

In carrying the invention into effect according to one convenient mode, by way of example, the mud flap comprises a rectangular sheet of vulcanized rubber or elastomeric material 10 having a plurality of transversely aligned rows of flap covered apertures 11 formed therein.

Each aperture 11 and associated flap 12 is substantially rectangular in shape and formed simultaneously by cutting through the sheet 10 along the base 13 and opposite sides 14 of the aperture leaving the upper edge 15 integral with the sheet 10 to form the flap 12. The point of juncture of each side 14 with its upper edge 15 is formed with a circular aperture 16, which construction increases the flexibility of the flap 12 and minimizes the possibility of the sheet 10 tearing at these points during use.

Three rows of apertures 11 and associated flaps 12 are positioned one above the other and each row has five flap covered apertures 11. The upper edge 17 of the sheet 10 is provided with means (not shown) for connecting it to the vehicle.

It will be readily appreciated that the number of rows and the number of flap covered apertures in each row may be varied as desired. Furthermore, the shape of each aperture and associated flap may also be varied, for example, they may be of frusto-conical or inverted frusto-conical form.

The width and depth of the sheet 10 determines the size of the flaps 12 and the thickness of the sheet controls the diameter of the circular apertures 16 in order to give sufficient flexibility to the hinge lines 15. The following example indicates convenient dimensions for one particular size of mud flap:

A rectangular mud flap 19¼" wide and 13⅞" deep has 15 subsidiary flaps arranged in three equal rows. The top of the first row of flaps commences 3" from one of the 19¼" sides. The flaps are 2" deep and 2½" wide with a ½" hole at each corner of the hinge, there being a spacing of 1⅛" between adjacent flaps in a row and 1½" between the bottom of one row of flaps and the hinger of the next row. For narrower or wider mud flaps the subsidiary flaps would remain in three rows. For shorter mud flaps the size of the subsidiary flaps would be reduced so as to give sufficient rows of flaps. For longer mud flaps the number of rows of flaps would be increased keeping the same size and number per row as for a shorter flap of the same width.

In a modified form of the invention, the upper edge 15 of each aperture 12 may also be cut and a separate flap provided covering a plurality of the apertures in one row.

In operation, when the vehicle is in motion the flaps 12 covering the apertures 11 are opened by the resulting air current and stream of aqueous matter. The velocity of such stream, in impinging on the flaps in an upward direction, is immediately reduced and deflected downwardly in the form of a number of independent streams. Due to the fact that the air current has a substantial area through which to pass, its velocity is also reduced and consequently the stream of aqueous matter is not carried rearwardly so far as with conventional mud flaps.

Having thus described my invention, what I claim and desire to protect by Letters Patent is:

In combination with wheeled vehicle a mud flap mounted rearwardly of at least the rear wheels of said vehicle, said mud flap comprising: a sheet of elastomeric material, said sheet having a plurality of apertures therethrough and hinged flaps covering said apertures, said flaps being integral with said sheet along one edge and the ends of said one edge being formed with circular apertures, so that, said flaps will be sufficiently flexible to be opened by a stream of aqueous matter and capable of deflecting said matter downwardly.

References Cited

UNITED STATES PATENTS

| | | | |
|---|---|---|---|
| 2,205,661 | 6/1940 | Kraft | 160—237 |
| 2,668,298 | 2/1954 | Kimmons | 160—180 |

BENJAMIN HERSH, *Primary Examiner.*

MILTON BUCHLER, *Examiner.*

L. D. MORRIS, *Assistant Examiner.*